United States Patent
Kawabata et al.

(10) Patent No.: US 11,970,093 B2
(45) Date of Patent: Apr. 30, 2024

(54) VEHICLE SEAT

(71) Applicant: TOYOTA BOSHOKU KABUSHIKI KAISHA, Aichi (JP)

(72) Inventors: Yuki Kawabata, Aichi (JP); Yoshihiro Murase, Aichi (JP)

(73) Assignee: TOYOTA BOSHOKU KABUSHIKI KAISHA, Aichi (JP)

(*) Notice: Subject to any disclaimer, the term of this patent is extended or adjusted under 35 U.S.C. 154(b) by 8 days.

(21) Appl. No.: 17/899,042

(22) Filed: Aug. 30, 2022

(65) Prior Publication Data

US 2023/0095035 A1 Mar. 30, 2023

(30) Foreign Application Priority Data

Sep. 29, 2021 (JP) .................................. 2021-159177

(51) Int. Cl.
| | |
|---|---|
| *B60N 2/235* | (2006.01) |
| *B60N 2/22* | (2006.01) |
| *B60N 2/23* | (2006.01) |

(52) U.S. Cl.
CPC .............. *B60N 2/22* (2013.01); *B60N 2/232* (2013.01); *B60N 2/235* (2013.01); *B60N 2/2356* (2013.01)

(58) Field of Classification Search
CPC ...... B60N 2/2356; B60N 2/232; B60N 2/235; B60N 2/2358; B60N 2/20
See application file for complete search history.

(56) References Cited

U.S. PATENT DOCUMENTS

| | | | |
|---|---|---|---|
| 2006/0012232 A1* | 1/2006 | Coughlin | B60N 2/2358 297/367 R |
| 2013/0341985 A1* | 12/2013 | Tsuruta | B60N 2/12 297/354.1 |
| 2014/0110986 A1* | 4/2014 | Yamaguchi | B60N 2/12 297/378.1 |
| 2020/0282874 A1 | 9/2020 | Motoi | |

FOREIGN PATENT DOCUMENTS

| | | | | |
|---|---|---|---|---|
| DE | 102019110151 A1 | * | 10/2019 | ............... B60N 2/20 |
| JP | 2020-142582 | | 9/2020 | |
| WO | WO-0144010 A1 | * | 6/2001 | ........... B60N 2/2354 |
| WO | WO-2010007885 A1 | * | 1/2010 | ........... B60N 2/2358 |
| WO | WO-2016084471 A1 | * | 6/2016 | ........... B60N 2/2358 |
| WO | WO-2017199802 A1 | * | 11/2017 | ............. A47C 1/025 |

* cited by examiner

*Primary Examiner* — Timothy J Brindley
(74) *Attorney, Agent, or Firm* — Greenblum & Bernstein, P.L.C.

(57) ABSTRACT

There is provided a vehicle seat that allows detection of forgetting to mount a bracket for centering in a recliner with a limited space along a seat-width direction. One aspect of the present disclosure is a vehicle seat including a recliner mounted to a back frame. The recliner includes a recliner plate, a recliner main body configured to pivot the back frame relative to the recliner plate, a bracket fixed to the recliner plate, and a hinge pin penetrating the recliner main body, the recliner plate, and the bracket. The recliner plate includes a confirmation hole not overlapping the recliner main body. The bracket includes a body portion having a first through hole, and a detection target portion extending from the body portion to the confirmation hole and overlapping the confirmation hole.

2 Claims, 7 Drawing Sheets

VEHICLE SEAT

CROSS-REFERENCE TO RELATED APPLICATIONS

This application claims the benefit of Japanese Patent Application No. 2021-159177 filed on Sep. 29, 2021 with the Japan Patent Office, the entire disclosure of which is incorporated herein by reference.

BACKGROUND

The present disclosure relates to a vehicle seat.

A recliner provided to a vehicle seat arranged in a vehicle, such as a car, comprises a hinge pin, including a shaft that penetrates a frame along a seat-width direction (see Japanese Unexamined Patent Application Publication No. 2020-142582). In order to maintain a position and an inclination of a central axis of the shaft that serves as a rotation center of the recliner, the recliner is provided with a bracket (i.e., a base bracket) for centering of the hinge pin. The shaft of the hinge pin is inserted through a through hole of the bracket for centering.

The bracket for centering is formed to have a specified dimension (i.e., a height) along the seat-width direction. Thus, it is possible by means of a proximity sensor to detect forgetting to mount the bracket for centering (that is, presence/absence of the bracket) in a seat manufacturing process.

SUMMARY

Some design conditions of a vehicle seat do not allow enough space along the seat-width direction, and thus the height of the bracket for centering is limited. In this case, if the height of the bracket for centering is smaller than a detection threshold of the proximity sensor, it is impossible to detect forgetting to mount by means of the proximity sensor.

In one aspect of the present disclosure, it is desirable to provide a vehicle seat that allows detection of forgetting to mount a bracket for centering in a recliner with a limited space along the seat-width direction.

One aspect of the present disclosure is a vehicle seat that comprises a seat cushion; a seatback pivotable in seat front-rear directions relative to the seat cushion; a back frame supporting the seatback; and a recliner mounted to the back frame.

The recliner comprises a recliner plate; a recliner main body coupled to a first surface of the recliner plate and to the back frame, and configured to pivot the back frame in the seat front-rear directions relative to the recliner plate; a bracket fixed to a second surface of the recliner plate located opposite to the first surface; and a hinge pin penetrating the recliner main body, the recliner plate, and the bracket in a seat-width direction.

The recliner plate comprises a confirmation hole provided at a position not overlapping the recliner main body in an axial direction of the hinge pin. The bracket comprises a planar body portion comprising a first through hole to define a position of a central axis of the hinge pin; and a detection target portion extending from the body portion to the confirmation hole and overlapping the confirmation hole.

The above-described configuration allows confirmation of presence/absence of the detection target portion of the bracket by inserting a bracket detection sensor into the confirmation hole provided in the recliner plate. Thus, it is possible to detect forgetting to mount the bracket having a height that disables detection by a proximity sensor in a recliner with a limited space along the seat-width direction.

In one aspect of the present disclosure, the recliner plate may further comprise a positioning hole provided at a position not overlapping the recliner main body in the axial direction of the hinge pin. The bracket may further comprise a positioner extending from the body portion to the positioning hole and comprising a second through hole overlapping the positioning hole. With such configuration, it is possible to easily and properly perform position adjustment of the bracket by aligning the positioning hole and the second through hole.

In one aspect of the present disclosure, the detection target portion may be welded to the recliner plate. With such configuration, the detection target portion can be used as a welded portion. Thus, it is possible to reduce a surface area and a weight of the bracket.

BRIEF DESCRIPTION OF THE DRAWINGS

An exemplary embodiment of the present disclosure will be described hereinafter with reference to the accompanying drawings, in which.

DETAILED DESCRIPTION OF EXEMPLARY EMBODIMENTS

1. First Embodiment 1-1. Configuration

Figure 1:
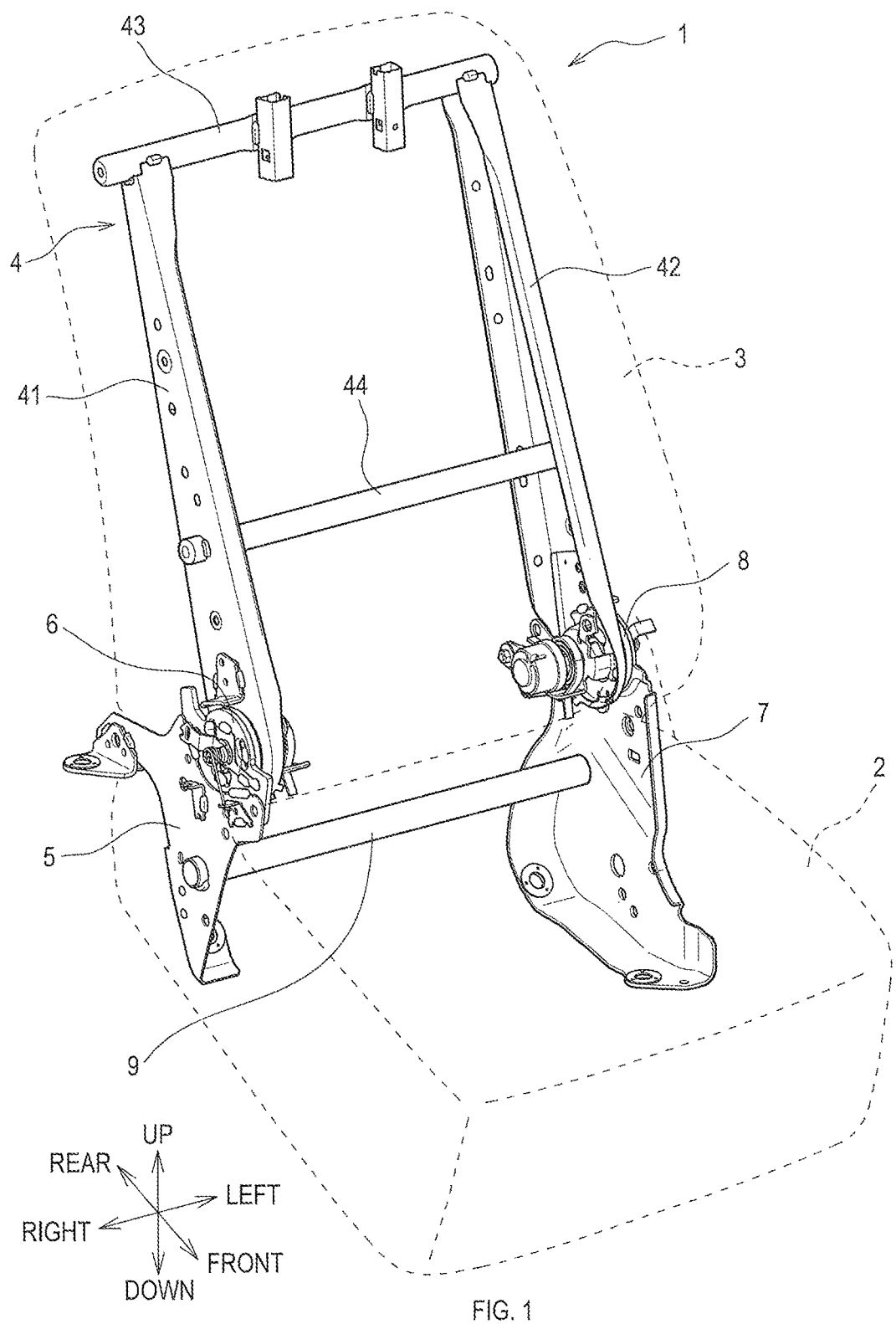
FIG. 1 is a schematic perspective view showing a vehicle seat of the embodiment.

A vehicle seat 1 shown in FIG. 1 comprises a seat cushion 2, a seatback 3, a back frame 4, a first lower arm 5, a first recliner 6, a second lower arm 7, a second recliner 8, and a rod 9.

The vehicle seat 1 is used as a seat for a passenger car. Specifically, the vehicle seat 1 configures a left side seat of a backseat for the passenger car. On a right side of the vehicle seat 1 is installed a two-person seat configured by integrating a right side seat and a middle seat.

It is to be noted that directions in the description below and the drawings indicate respective directions in a state where the vehicle seat 1 is assembled to the vehicle (i.e., the passenger car). In the present embodiment, a seat-width direction corresponds to a left-right direction of the vehicle, and a seat front side corresponds to a vehicle front side.

The seat cushion 2 is a portion to support buttocks of an occupant. The seatback 3 is a portion to support a back of the occupant. The seatback 3 is pivotable in seat front-rear directions relative to the seat cushion 2.

The back frame 4 supports the seatback 3 and is pivotable in the seat front-rear directions together with the seatback 3. The back frame 4 comprises a first side frame 41, a second side frame 42, an upper frame 43, and a coupling member 44.

The first side frame 41 and the second side frame 42 each extend in a vertical direction and are arranged spaced apart from each other along the seat-width direction. The first side frame 41 is arranged on a right side of the second side frame 42.

The upper frame 43 couples an upper end of the first side frame 41 with an upper end of the second side frame 42 along the seat-width direction. The coupling member 44 couples the first side frame 41 with the second side frame 42 along the seat-width direction at a position lower than the upper frame 43.

[First Lower Arm]

The first lower arm 5 is a plate-shaped frame configured to be mounted to a vehicle.

The first lower arm 5 is coupled to a lower end of the first side frame 41 through the first recliner 6. In other words, the first side frame 41 is coupled to the vehicle by the first lower arm 5. The first lower arm 5 is arranged outward of the first side frame 41 in the seat-width direction.

[First Recliner]

The first recliner 6 is coupled to the first side frame 41 of the back frame 4 and to the first lower arm 5.

The first recliner 6 is configured to pivot the back frame 4 in the seat front-rear directions relative to the first lower arm 5 (i.e., relative to the vehicle and the seat cushion 2).

Figure 2:
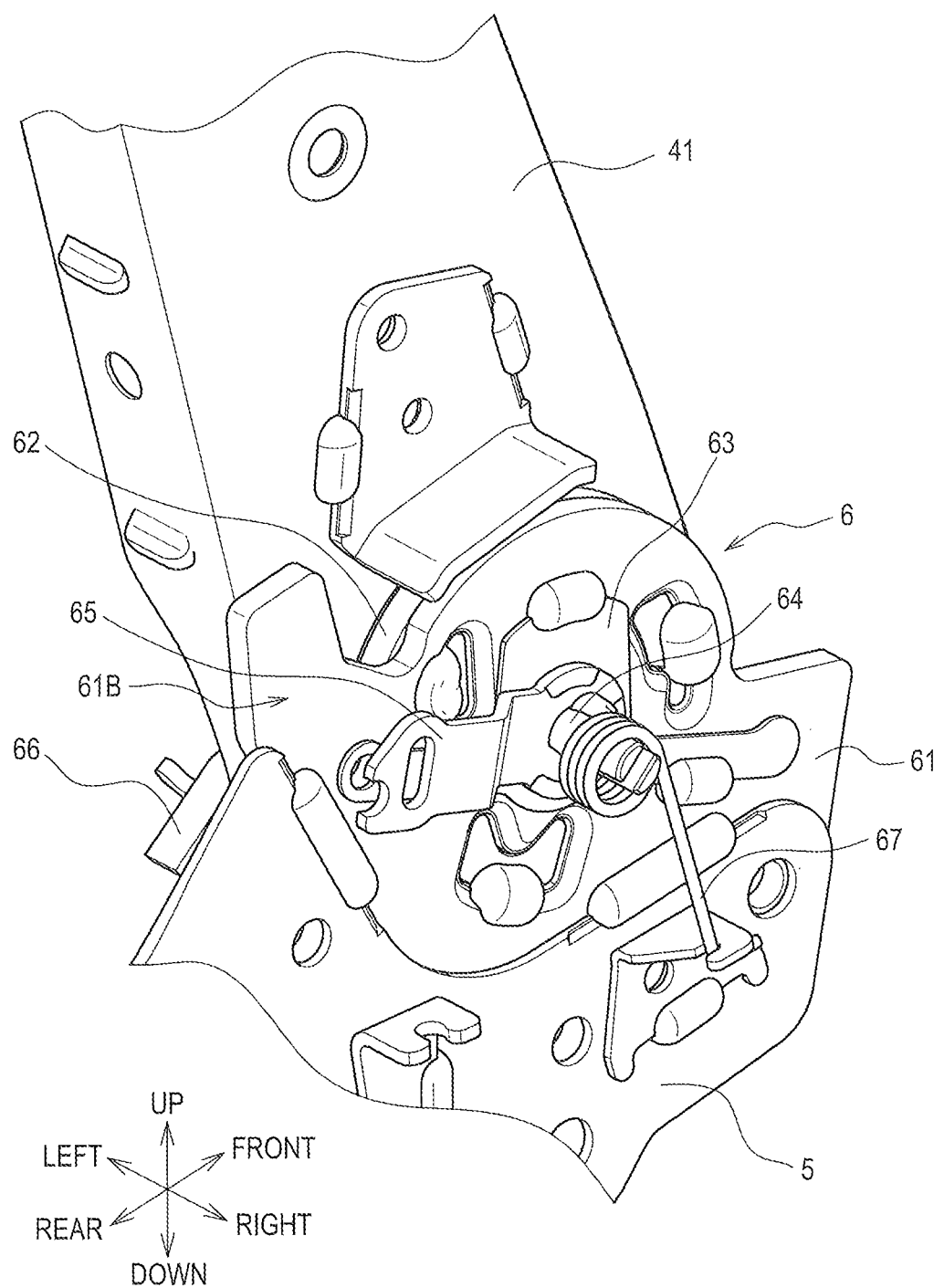
FIG. 2 is a schematic perspective view of a first side frame, a first lower arm, and a first recliner in the vehicle seat of FIG. 1.

As shown in FIG. 2, the first recliner 6 comprises a recliner plate 61, a recliner main body 62, a bracket 63, a hinge pin 64, a release lever 65, a pivoting-force application spring 66, and a return spring 67.

<Recliner Plate>

The recliner plate 61 is a planar member that is superposed on the first lower arm 5 from inside (i.e., left side) in the seat-width direction. The recliner plate 61 is arranged outward of the first side frame 41 in the seat-width direction. The recliner plate 61 has a thickness direction consistent with the seat-width direction.

Figure 3:
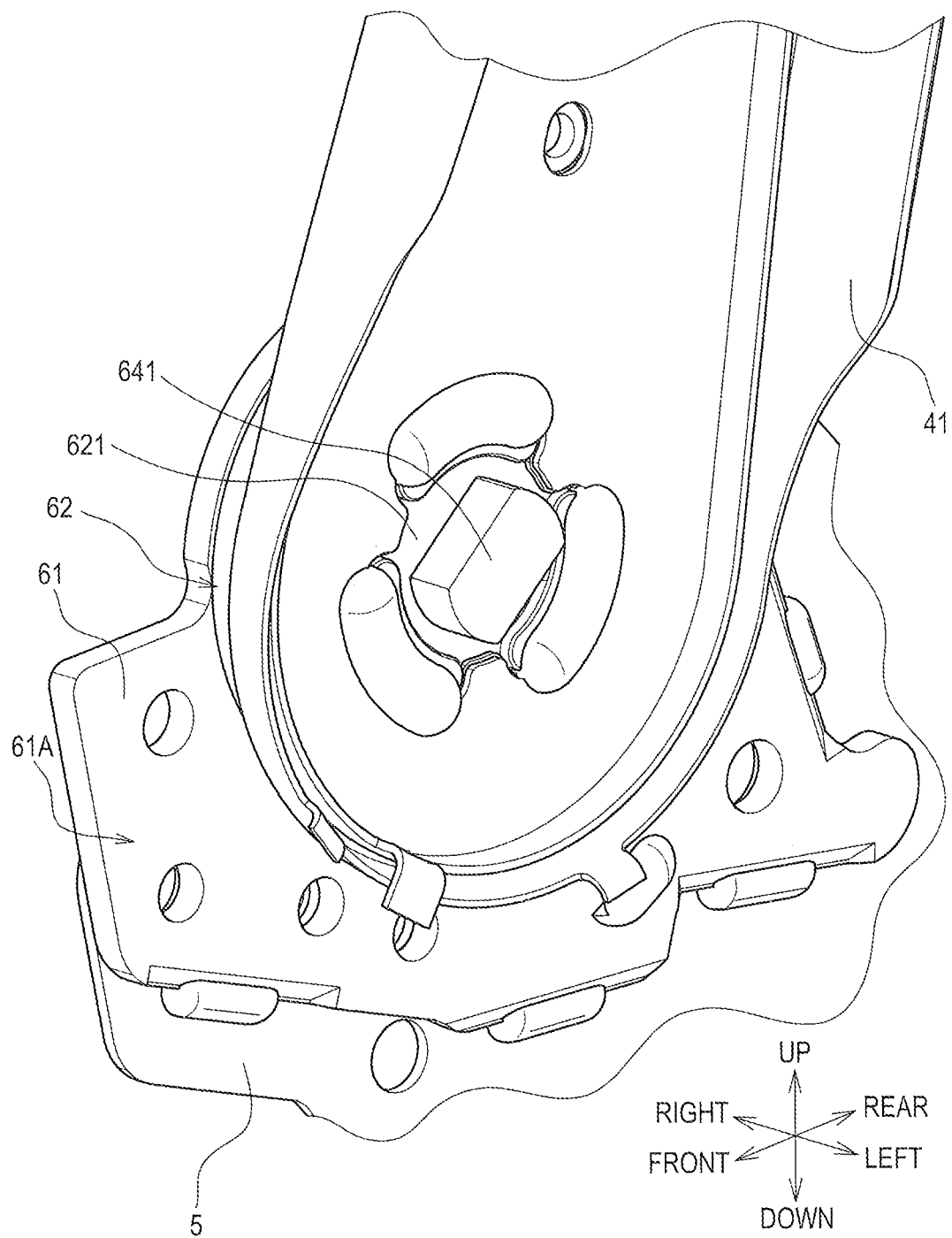
FIG. 3 is a schematic perspective view of the first side frame, the first lower arm, and the first recliner of FIG. 2.

The recliner plate 61 has a first surface 61A shown in FIG. 3 to which the recliner main body 62 is welded and a second surface 61B shown in FIG. 2 to which the first lower arm 5 is welded. The first surface 61A is a plate surface inward in the seat-width direction, and the second surface 61B is a plate surface opposite to the first surface 61A, in other words, a plate surface outward in the seat-width direction. It is to be noted that, some components, such as the pivoting-force application spring 66, in the first recliner 6 are not shown in FIG. 3.

Figure 4:
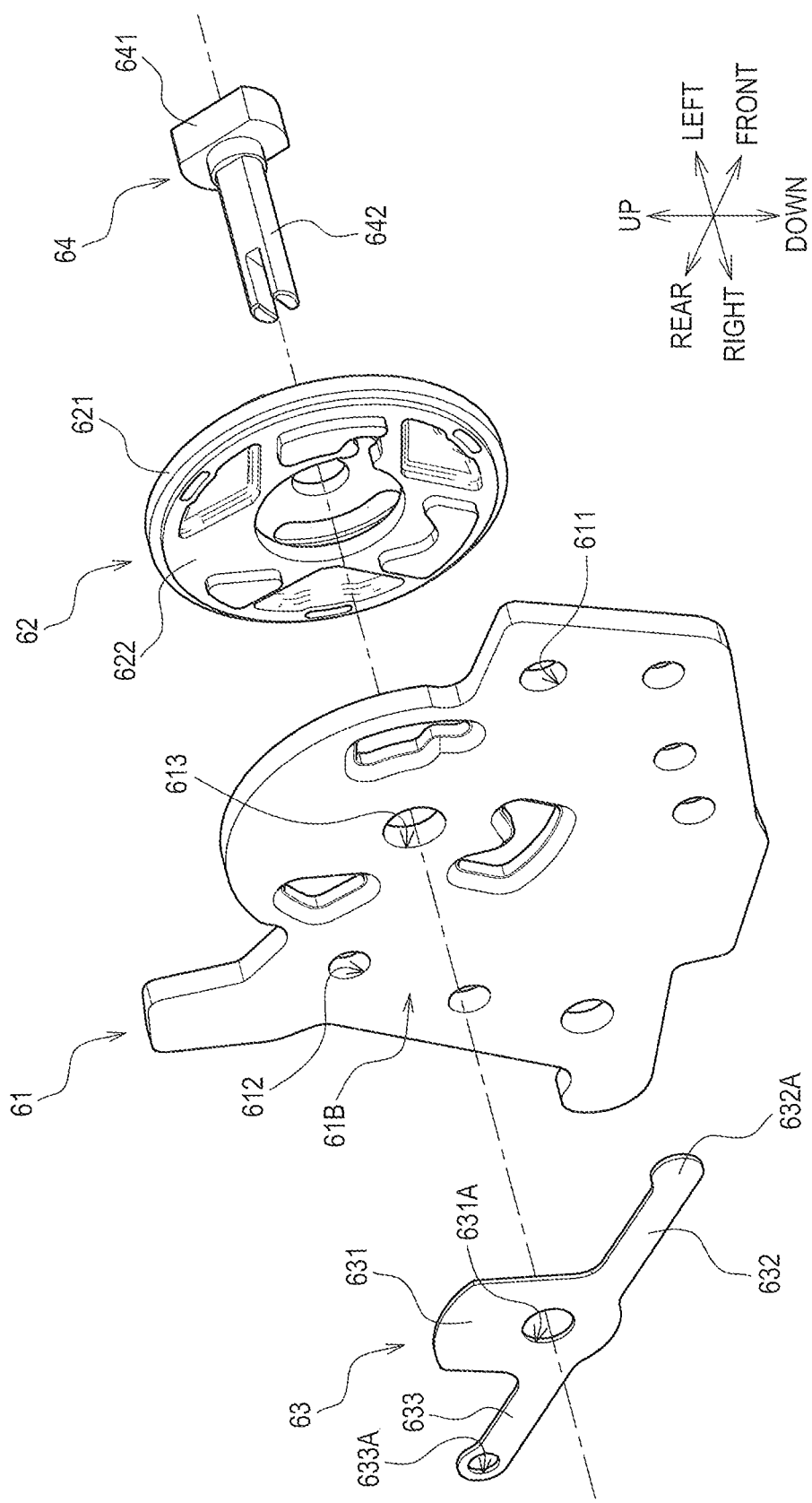
FIG. 4 is a schematic exploded perspective view of the first recliner of FIG. 2.

As shown in FIG. 4, the recliner plate 61 comprises a confirmation hole 611, a positioning hole 612, and a pin insertion hole 613.

The confirmation hole 611 is a through hole to confirm presence/absence of the bracket 63 in a manufacturing process of the vehicle seat 1. The confirmation hole 611 is arranged at a position not overlapping the recliner main body 62 in an axial direction of the hinge pin 64 (i.e., the seat-width direction). Although the confirmation hole 611 is arranged on the seat front side of the pin insertion hole 613 in the present embodiment, a position of the confirmation hole 611 is not limited to this.

The positioning hole 612 is a through hole to perform positioning of the bracket 63 in the manufacturing process of the vehicle seat 1. The positioning hole 612 is arranged at a position not overlapping the recliner main body 62 in the axial direction of the hinge pin 64. Although the positioning hole 612 is arranged at a position on a seat rear side of the pin insertion hole 613 in the present embodiment, a position of the positioning hole 612 is not limited to this.

The pin insertion hole 613 is a through hole through which a shaft 642 of the hinge pin 64 is inserted. The pin insertion hole 613 has an opening area (i.e., a hole diameter) greater than an opening area of each of the confirmation hole 611 and the positioning hole 612.

<Recliner Main Body>

The recliner main body 62 is a publicly-known device that is coupled to the first surface 61A of the recliner plate 61 and to the back frame 4, and is configured to pivot the back frame 4 in the seat front-rear directions relative to the recliner plate 61.

Figure 5:
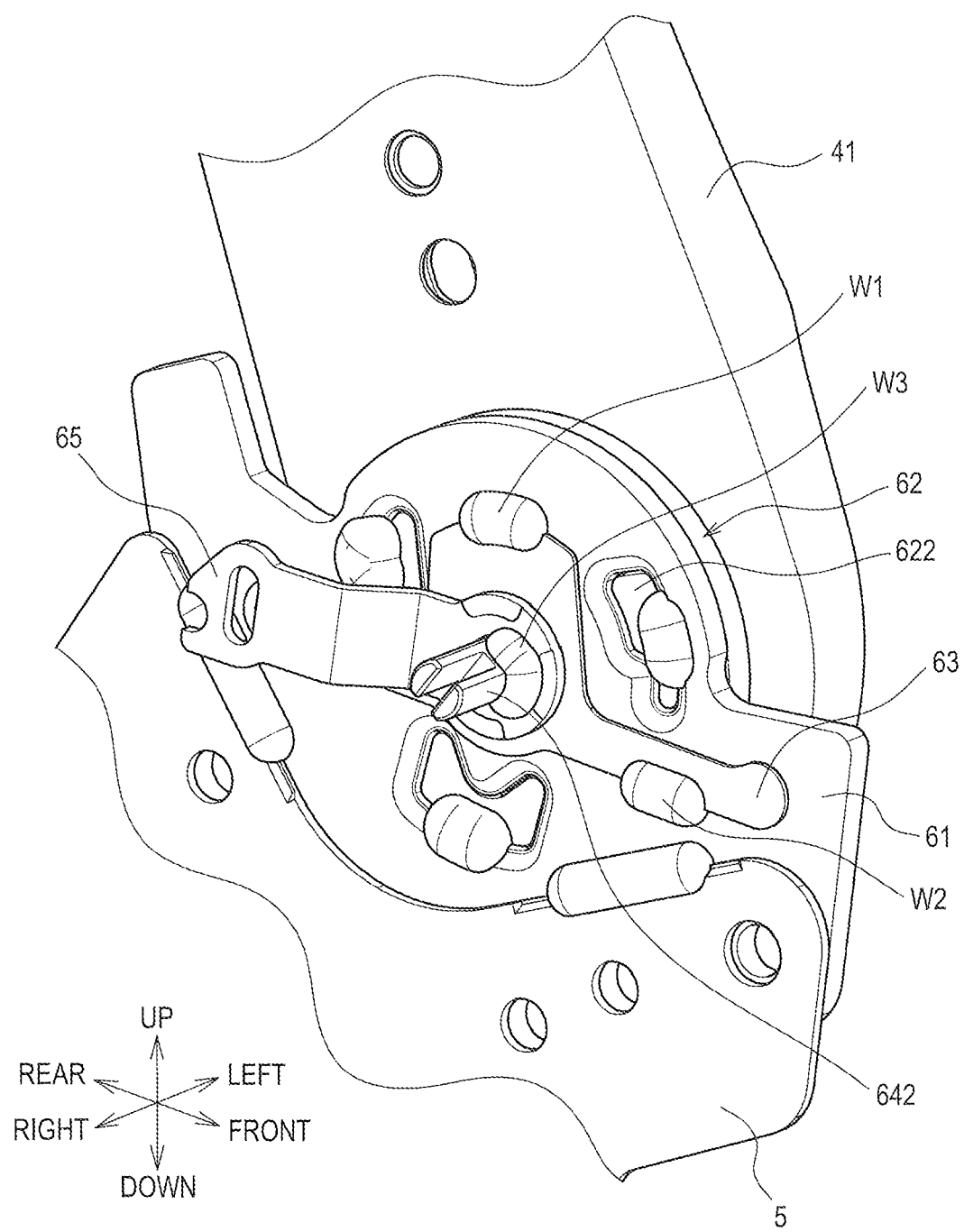
FIG. 5 is a schematic perspective view of the first side frame, the first lower arm, and the first recliner of FIG. 2.

The recliner main body 62 comprises a first portion 621 and a second portion 622 rotatable relative to the first portion 621. As shown in FIG. 3, the first portion 621 is fixed to the first side frame 41 by welding. As shown in FIG. 5, the second portion 622 is fixed to the recliner plate 61 by welding. It is to be noted that, some components, such as the return spring 67, in the first recliner 6 are not shown in FIG. 5.

The recliner main body 62 comprises a locking mechanism to restrict relative pivoting of the first portion 621 with respect to the second portion 622. The locking mechanism is switched between a locked state restricting pivoting and an unlocked state allowing pivoting by operating the release lever 65.

<Bracket>

The bracket 63 is a planar member to perform centering (i.e., adjustment of a tilt and a position of a central axis) of the hinge pin 64.

The bracket 63 is fixed to the second surface 61B of the recliner plate 61. Specifically, the bracket 63 is arranged such that the bracket 63 and the recliner main body 62 hold the recliner plate 61 therebetween.

Figure 6:
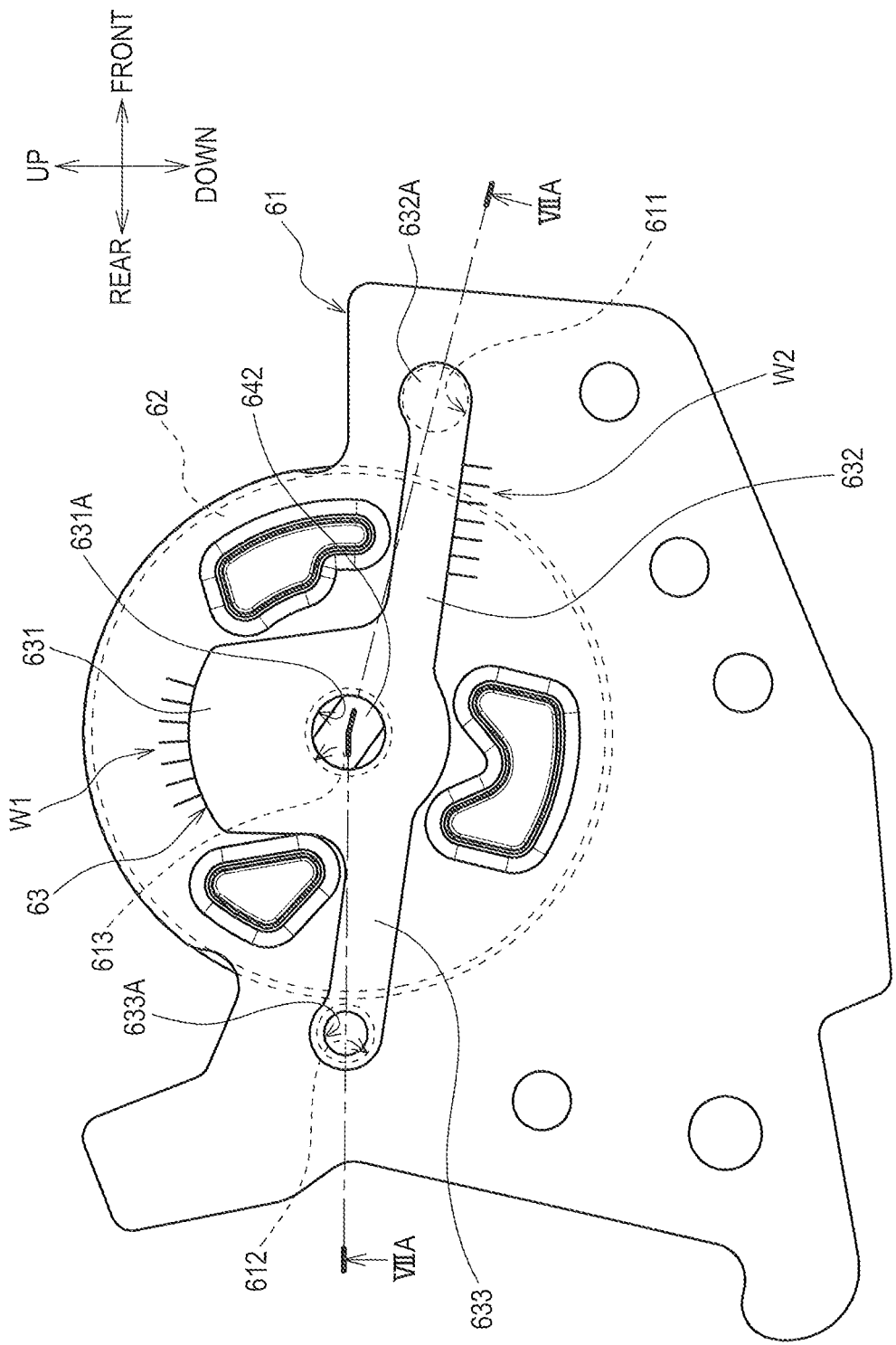
FIG. 6 is a schematic side view of the first recliner of FIG. 2.

The bracket 63 has a thickness smaller than that of the recliner plate 61. The thickness of the bracket 63 is, for example, 1 mm or less. As shown in FIG. 6, the bracket 63 comprises a body portion 631, a detection target portion 632, and a positioner 633.

The body portion 631 is a planar portion comprising a circular first through hole 631A, through which the shaft 642 of the hinge pin 64 is inserted, to thereby define the position of the central axis of the hinge pin 64. The first through hole 631A has an inner diameter that is approximately equal to a maximum outer diameter of the shaft 642 of the hinge pin 64. A central axis of the first through hole 631A is consistent with a pivot axis of the first recliner 6.

An entirety of the body portion 631 overlaps the recliner plate 61 and the recliner main body 62 in the axial direction of the hinge pin 64. The body portion 631 comprises an upper end welded to the recliner plate 61 by weld bead W1.

The detection target portion 632 is an arm-shaped (i.e., strip-shaped) portion extending from the body portion 631 to the confirmation hole 611. The detection target portion 632 extends from a position lower than the first through hole 631A of the body portion 631 toward the seat front side.

The detection target portion 632 comprises a distal end portion 632A that overlaps the confirmation hole 611. The distal end portion 632A covers the entire confirmation hole 611. Also, the detection target portion 632 is welded to the recliner plate 61 by a weld bead W2.

The weld bead W2 is provided at a lower end of the detection target portion 632 in an area on the seat rear side from the distal end portion 632A (i.e., at a position closer to the body portion 631). Also, the weld bead W2 partially overlaps the recliner main body 62 in the axial direction of the hinge pin 64.

The positioner 633 is an arm-shaped portion extending from the body portion 631 to the positioning hole 612. The positioner 633 extends from a position lower than the first through hole 631A of the body portion 631 toward the seat rear side. In the present embodiment, an extending direction of the positioner 633 and an extending direction of the detection target portion 632 are parallel and opposite to each other.

The positioner 633 comprises a second through hole 633A overlapping the positioning hole 612. The second through hole 633A has a diameter smaller than that of the positioning hole 612, and an entirety of the second through hole 633A overlaps the positioning hole 612. In the manufacturing process of the vehicle seat 1, positioning of the bracket 63 is performed by inserting a positioning jig through the positioning hole 612 and the second through hole 633A.

Figure 7A:
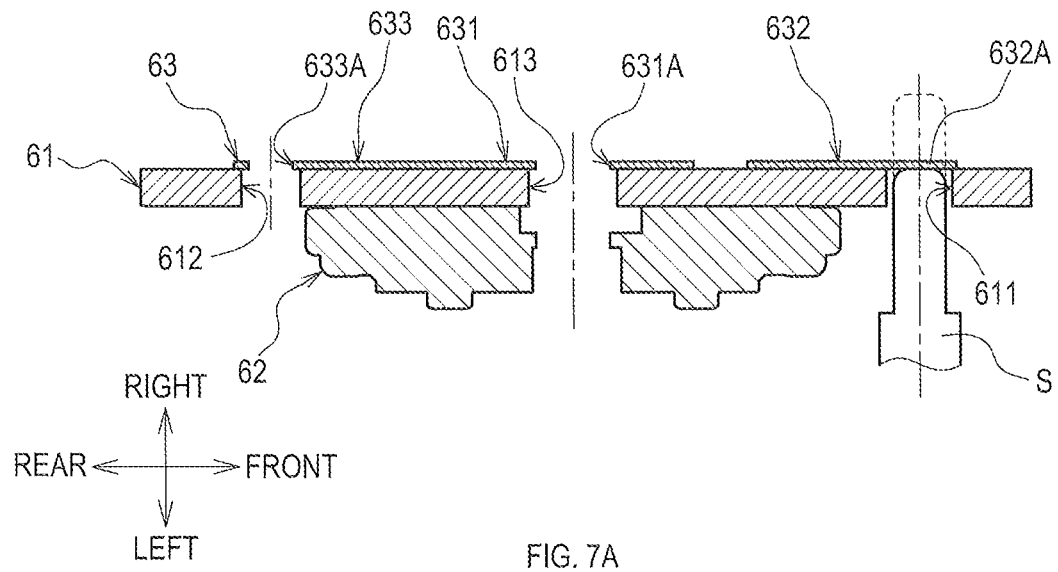
FIG. 7A is a schematic sectional view along a line VIIA-VIIA of FIG. 6.

As shown in FIG. 7A, in the manufacturing process of the vehicle seat 1, a bar-shaped detection sensor S is inserted into the confirmation hole 611 of the recliner plate 61 from inside in the seat-width direction. If the bracket 63 is properly arranged, then a leading end of the detection sensor S contacts the detection target portion 632 of the bracket 63 in the confirmation hole 611. As a result, presence of the bracket 63 is detected.

Figure 7B:
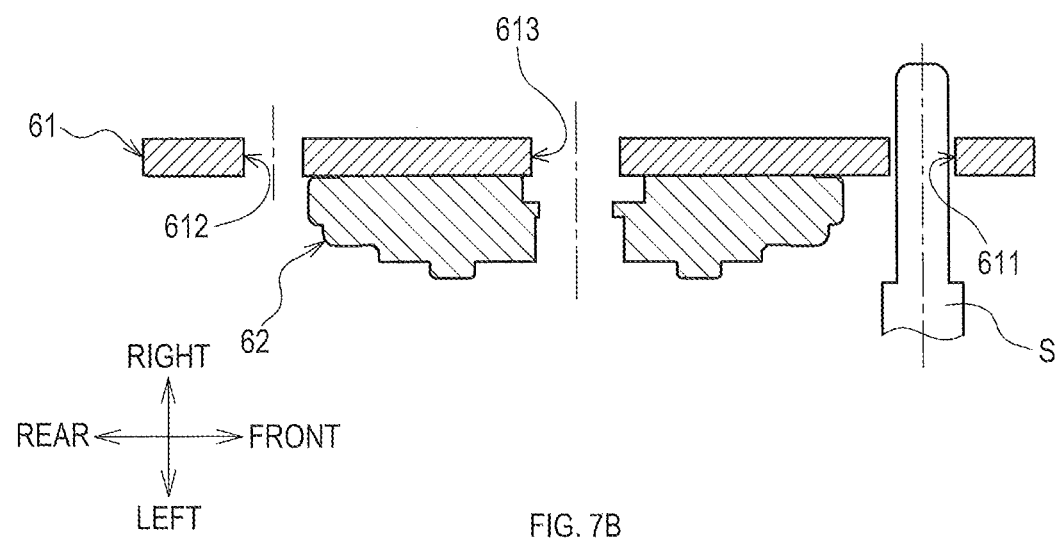
FIG. 7B is a schematic sectional view showing a state of the first recliner of FIG. 7A without a bracket.

On the other hand, as shown in FIG. 7B, if the bracket 63 is not arranged on the recliner plate 61, then the leading end of the detection sensor S passes through the confirmation hole 611. As a result, absence of the bracket 63 is detected.

In the manufacturing process of the vehicle seat 1, the recliner plate 61, the recliner main body 62, and the bracket 63 are arranged at specified positions, and thereafter the detection sensor S is inserted into the confirmation hole 611 to thereby confirm mounting of the bracket 63. After that, each welding is performed.

<Hinge Pin>

The hinge pin 64 shown in FIG. 4 penetrates the recliner main body 62, the recliner plate 61, and the bracket 63 in the seat-width direction. The central axis of the hinge pin 64 is consistent with the pivot axis of the first recliner 6.

The hinge pin 64 comprises a head 641 and the shaft 642. The head 641 contacts the recliner main body 62 from inside in the seat-width direction. The shaft 642 extends from the head 641 outward in the seat-width direction.

As shown in FIG. 5, a leading end of the shaft 642 projects from the bracket 63 outward in the seat-width direction. The shaft 642 is welded to the release lever 65 by a weld bead W3.

<Release Lever>

The release lever 65 changes a locking status of the recliner main body 62. A not-shown wire is coupled to the release lever 65.

When the release lever 65 is rotated from a locked position by pulling the wire, axial rotation of the hinge pin 64 coupled to the release lever 65 is caused. The axial rotation of the hinge pin 64 causes rotation of a cam arranged inside the recliner main body 62, and locking is released. Pulling of the release lever 65 by the wire is stopped, the release lever 65 returns to the locked position by means of the return spring 67 (see FIG. 2).

<Pivoting-force Application Spring>

The pivoting-force application spring 66 shown in FIG. 2 configures a pivoting force generation mechanism to apply to the first side frame 41 a pivoting force relative to the recliner plate 61.

The pivoting-force application spring 66 is coupled to the first side frame 41 and the recliner plate 61. When locking of the recliner main body 62 is released, the first side frame 41 pivots toward the seat front side by an elastic force of the pivoting-force application spring 66.

[Second Lower Arm]

The second lower arm 7 shown in FIG. 1 is a plate-shaped frame configured to be mounted to the vehicle.

The second lower arm 7 is coupled to the back frame 4 at a position apart from the first lower arm 5 in the seat-width direction. Specifically, the second lower arm 7 is coupled to a lower end of the second side frame 42 through the second recliner 8. In other words, the second side frame 42 is coupled to the vehicle by the second lower arm 7.

[Second Recliner]

The second recliner 8 is coupled to the second side frame 42 of the back frame 4 and to the second lower arm 7.

The second recliner 8 is a publicly-known device configured to cause the back frame 4 to pivot in the seat front-rear directions relative to the second lower arm 7 (and thus to the vehicle and the seat cushion 2) in cooperation with the first recliner 6.

[Rod]

The rod 9 is a tubular member coupling the first lower arm 5 and the second lower arm 7 along the seat-width direction. The rod 9 penetrates the first lower arm 5 and the second lower arm 7 in respective thickness directions. The rod 9 is fixed to the first lower arm 5 and the second lower arm 7 for example, by welding.

1-2. Effects

According to the embodiment detailed above, the following effects can be obtained.

(1a) Presence/absence of the detection target portion 632 of the bracket 63 can be confirmed by inserting a bracket detection sensor into the confirmation hole 611 provided in the recliner plate 61. Thus, it is possible to detect forgetting to mount the bracket 63 having a height that disables detection by a proximity sensor in a recliner with a limited space along the seat-width direction.

(1b) It is possible to easily and properly perform position adjustment of the bracket 63 by aligning the positioning hole 612 of the recliner plate 61 and the second through hole 633A of the bracket 63.

(1c) The detection target portion 632 can be used as a welded portion by welding the detection target portion 632 to the recliner plate 61. Thus, it is possible to reduce a surface area and a weight of the bracket 63.

2. Other Embodiments

Although one embodiment of the present disclosure has been described above, it should be understood that the present disclosure is not limited to the above-described embodiment but may be practiced in various forms.

(2a) In the vehicle seat of the above-described embodiment, the bracket may not necessarily comprise the positioner.

(2b) In the vehicle seat of the above-described embodiment, the detection target portion of the bracket may not necessarily be welded to the recliner plate.

(2c) In the vehicle seat of the above-described embodiment, the lower arm may not necessarily be fixed to the vehicle. Specifically, the lower arm may be fixed to a cushion frame supporting the seat cushion.

(2d) The vehicle seat of the above-described embodiment may be applied to seats to be used for cars other than passenger cars, or seats to be used for vehicles other than cars, such as railroad vehicles, ships and boats, and aircrafts.

(2e) A function served by a single element in the above-described embodiments may be achieved by a plurality of elements, or a plurality of functions served by a plurality of elements may be achieved by a single element. Also, a part of a configuration in any of the above-described embodiments may be omitted. Further, at least a part of a configuration in any of the above-described embodiments may be added to, or replace, a configuration in another of the embodiments. It is to be noted that any form included in the technical idea defined by the language of the appended claims is an embodiment of the present disclosure.

What is claimed is:

1. A vehicle seat comprising:
   a seat cushion;
   a seatback pivotable in seat front-rear directions relative to the seat cushion;
   a back frame supporting the seatback; and
   a recliner mounted to the back frame,
     the recliner comprising:
       a recliner plate;
       a recliner main body coupled to a first surface of the recliner plate and to the back frame, and configured to pivot the back frame in the seat front-rear directions relative to the recliner plate;
       a bracket fixed to a second surface of the recliner plate located opposite to the first surface; and
       a hinge pin penetrating the recliner main body, the recliner plate, and the bracket in a seat-width direction,
       the recliner plate comprising:
         a confirmation hole provided at a position not overlapping the recliner main body in an axial direction of the hinge pin; and
         a positioning hole provided at a position not overlapping the recliner main body in the axial direction of the hinge pin, and
       the bracket comprising:
         a planar body portion comprising a first through hole to define a position of a central axis of the hinge pin;
         a detection target portion extending from the body portion to the confirmation hole and overlapping the confirmation hole; and
         a positioner extending from the body portion to the positioning hole and comprising a second through hole overlapping the positioning hole.

2. The vehicle seat according to claim 1, wherein the detection target portion is welded to the recliner plate.

* * * * *